Figure 2:
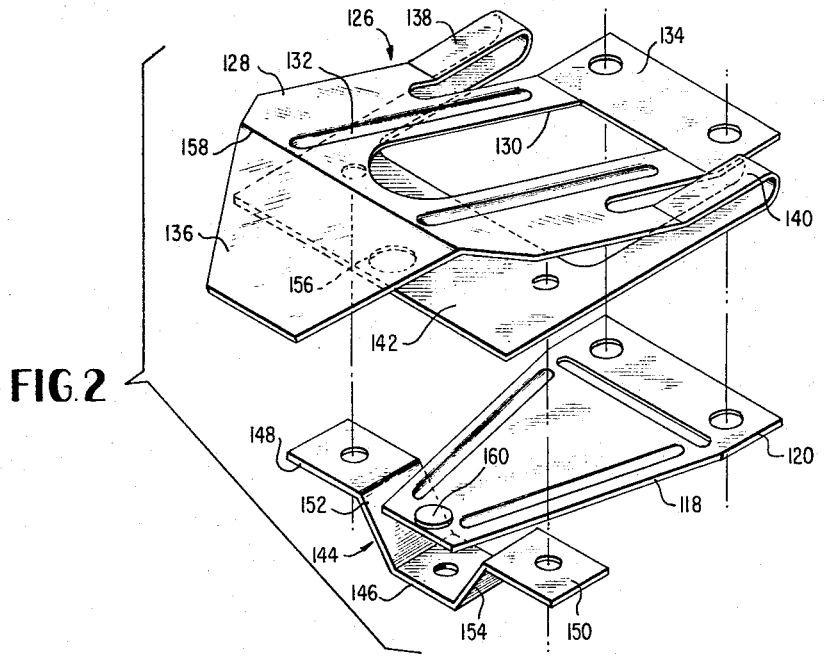

Jan. 3, 1967   K. P. MUELLER   3,295,544
PNEUMATIC CONTROL DEVICE
Filed Oct. 3, 1963

INVENTOR.
KLAUS P. MUELLER
BY
*Browne, Schuyler & Beveridge*
ATTORNEYS

United States Patent Office 3,295,544
Patented Jan. 3, 1967

---

3,295,544
PNEUMATIC CONTROL DEVICE
Klaus P. Mueller, Goshen, Ind., assignor to Robertshaw Controls Company, Richmond, Va., a corporation of Delaware
Filed Oct. 3, 1963, Ser. No. 313,673
6 Claims. (Cl. 137—85)

This invention relates to pneumatic control devices of the nozzle-flapper type having a proportional and derivative mode of operation for controlling variable conditions such as temperature, pressure, humidity or rate of flow.

An object of this invention is to provide an improved pneumatic control device in which a flapper is moved realtive to a leak port in response to deviations in a control condition to cause an output pressure to be transmitted to a condition controlling element, the output pressure in turn producing a feedback force to adjust the position of the flapper and gradually reduce the output pressure.

A further object of this invention is to provide an improved pneumatic control device in which a flapper closes the leak port in response to deviations in a controlled condition to produce an output pressure and including feedback means responsive to the output pressure for exerting a force on the flapper proportional to the output pressure in a direction to open the flapper and gradually reduce the output pressure.

Still another object is to provide an improved pneumatic control device having a proportional and derivative mode of operation with means for accurately adjusting the set point and the proportional relationship between the feedback force and output pressure.

A still further object is to provide an improved pneumatic control device having a novel range spring assembly permitting selective adjustment over a wide range of the set point and feed-back response.

The foregoing and other objects are achieved by the provision of a control chamber connected with a source of pneumatic pressure and having a leak port or nozzle through which the pressure is vented to ambient atmosphere. Separated from the control chamber by a pressure responsive movable wall is a branch chamber which is connected and disconnected from a source of pneumatic pressure in response to increases and decreases, respectively, in the control chamber pressure. For varying the pressure in the control chamber a resilient flapper having an unstressed position in which is closes the nozzle is connected with a pressure responsive diaphragm responsive to deviations in the condition being controlled.

Communicating through a restricted passage with the branch chamber is a feedback chamber having a pressure responsive movable plunger secured to a range spring assembly engaged with the flapper. For varying the proportional realtionship between the pressure in the feedback chamber and the pressure in the branch chamber a bleed port connects the feedback chamber with atmosphere with the rate of flow through the bleed port being controlled by an adjustable needle valve. The set point, that is, the force required to close the leak port by the pressure responsive diaphragm, is controlled by the range spring assembly which can be adjusted to urge the flapper away from the nozzle. When the condition being controlled deviates sufficiently to transmit a pressure to the diaphragm to overcome the set point force, the nozzle is closed to cause the branch chamber to be connected with the supply pressure which in turn transmits an output pressure to a final control element to correct the deviation in the control condition. As the pressure increases in the branch chamber the feedback chamber pressure increases gradually due to the restricted connection, and the feedback plunger moves in a direction opposite to that of the condition responsive diaphragm to adjust the position of the flapper and gradually reduce the feedback pressure with a force proportional to feedback pressure.

Figure 1:
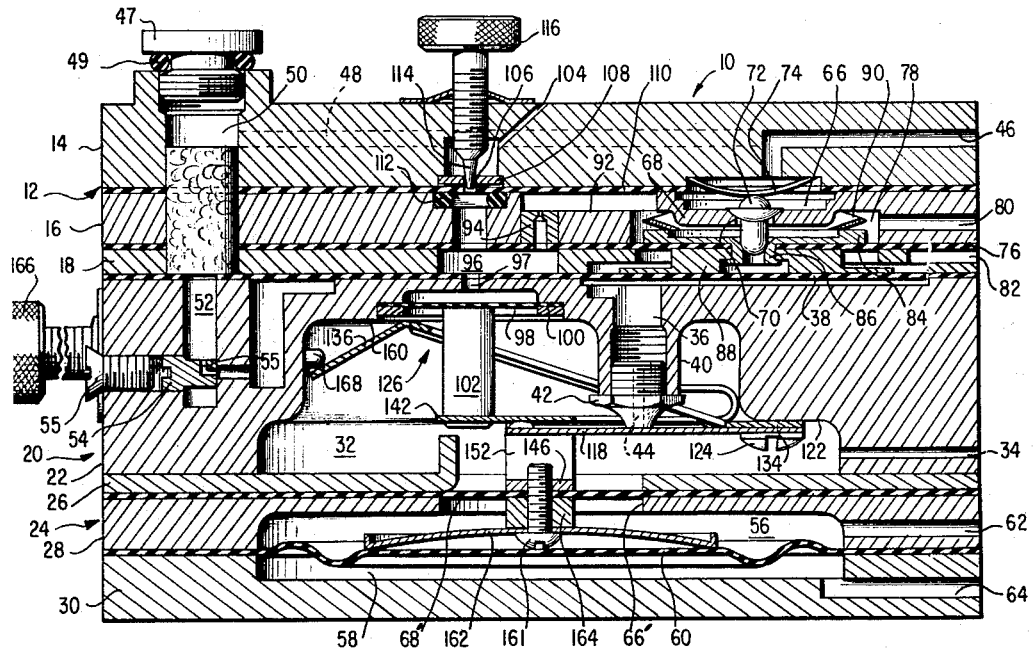

Other objects and advantages will become apparent from the following description taken in connection with the accompanying drawings in which FIG. 1 is a schematic, sectional view of a pneumatic control device embodying the invention;

FIG. 2 is an exploded perspective view of the range spring and flapper assembly of FIG. 1.

With reference to FIG. 1, reference numeral 10 identifies a casing including an upper section 12 made up of plate-like members 14, 16 and 18; a middle section 20 consisting of a plate-like member 22; and a lower section 24 made up of plate-like members 26, 28 and 30. Casing sections 12, 20 and 30 are secured together at their peripheries by conventional screws or bolts (not shown). Formed on the lower side of plate member 22 is a stepped recess or cavity 32 which communicates with ambient atmosphere through a port 34 formed in plate 22. Formed on the opposite side of cavity 32 in plate member 22 is an annular control chamber 36 having a pressure responsive movable wall formed by a resilient diaphragm 38. Diaphragm 38 is secured at its periphery between plate members 18 and 22 to provide a fluid-tight seal.

Plate member 22 is formed with a tubular extension 40 in which is threadedly mounted a nozzle fitting 42 having a nozzle port 44 for venting the pressure in control chamber 36 into cavity 32 and to atmosphere through port 34. Control chamber 36 communicates with a supply port 46 formed in plate 14 through a passage 48, a filter chamber 50 formed in upper section 12, a passage 52 in plate member 22, and a fixed restrictor 54. Opening 55 in restrictor 54 is smaller than opening 44 in nozzle fitting 42. Supply port 46 is connected with a supply of air at a constant regulated pressure. Consequently, the pressure in control chamber 36 varies in accordance with the pressure at nozzle opening 44.

Access to filter chamber 50 is provided by a threaded cap plug 47 mounted in the upper side of plate 14, and an O-ring 49 clamped between plate 14 and the flange of cap 47 provides a fluid-tight seal. Access to orifice fitting 54 is provided by a cap screw 55 mounted in plate member 22.

Plate members 28 and 30 are provided with cooperating recesses forming static pressure chambers 56 and 58 on the upper and lower side, respectively, of a differential pressure responsive diaphragm 60. Diaphragm 60 is clamped at its periphery between plate members 28 and 30 and senses the pressure differential between chambers 56 and 58. Chamber 56 communicates with an inlet port 62 and chamber 58 communicates with an inlet port 64.

Formed in the central portions of plates 28 and 26 is an opening 66' through which extends a flexible gasket 68' which in turn is clamped between plate members 26 and 28 and forms a sealing diaphragm separating chamber 56 from cavity 32.

Formed by cooperating recesses in plate members 14 and 16 is a chamber 66 which communicates with supply port 46. The lower wall 68 of chamber 66 is formed with a port 70 controlled by a relay valve 72. Valve 72 is biased to close port 70 by a disc spring 74 mounted in chamber 66. Secured between plate members 16 and 18 is a flexible diaphragm 76 which forms the lower wall of a branch chamber 78, the upper wall of which is formed by wall 68 of chamber 66. Pressure is transmitted from branch chamber 78 through an outlet port 80 formed in member 16, and the space between diaphragms 76 and 38 communicates with ambient atmosphere through a port 82 formed in plate member 18.

Carried by the center of the movable portion of diaphragm 76 is a spring seat member 84 formed with a tubular exhaust member 86 which extends to the opposite side of diaphragm 76. The end of exhaust member 86 is turned down to secure a spacer plate 88 to the opposite side of the central portion of diaphragm 76. Mounted between wall 68 and spring seat 84 is a spring member 90 which biases member 84 in a direction to unseat the stem of valve 72 from exhaust member 86 and thereby connect branch chamber 78 with atmosphere through port 82.

Communication between branch chamber 78 and supply chamber 66 is controlled in response to pressure variations in control chamber 36. It is apparent that increases in pressure in chamber 36 acting against diaphragm 38 will exert a force tending to sequentially seat the stem of value 72 against exhaust member 86 to shut off communication between branch chamber 78 and atmosphere, and overcome the combined forces of springs 74 and 90 to unseat valve element 72 from port 70 to connect branch chamber 78 with chamber 66 and supply port 46. Conversely, upon decreases in pressure in control chamber 36, valve element 72 will first close port 70 to disconnect branch chamber 78 from supply chamber 66, and upon further decreases in control chamber pressure, spring 90 will cause exhaust member 86 to unseat from the stem of valve 72 and vent the pressure in branch chamber 78 to atmosphere through port 82.

Communicating with branch chamber 78 through a passage 92 having a restriction 94 therein is a feedback chamber 96. The feedback chamber pressure acts against a resilient diaphragm 98 through a port 97 formed in plate member 22. Feedback diaphragm 98 is secured to plate 22 at its periphery by a clamping ring 100. Variations in pressure in feedback chamber 96 cause diaphragm 98 to reciprocate vertically as viewed in FIG. 1, which motion is in turn transmitted to a feedback plunger 102 having one end engaged with the central portion of feedback diaphragm 98.

Feedback chamber 96 communicates with an atmosphere port 104 in plate 14 through an adjustable bleed port 106 formed in a disc 108 mounted in an annular groove in plate 14. The rate of flow through bleed port 106 is controlled by a needle valve 114 at one end of a threaded adjustment member 116 mounted in plate 14. Disc 108 is held in position by a resilient gasket 110 clamped between plate members 14 and 16, and O-ring 112 positioned on the opposite side of gasket 110 from disc 108.

The pressure in control chamber 36 varies in accordance with the pressure at nozzle 42, which in turn is controlled by a resilient flapper valve 118 preferably having a normal or unstressed position in which it closes nozzle opening 44. Flapper 118 is formed with a mounting flange 120 (FIG. 2) which is secured to a shoulder 122 in a cavity 32 by screws 124. Variations in pressure acting on condition responsive diaphragm 60, and on feedback diaphragm 98 are transmitted to flapper 118 through range spring assembly 126.

With reference to FIG. 2, range spring assembly 126 includes a body portion 128 formed with a slot 130 for receiving nozzle projection 40 and feedback plunger 102. Stiffening beads 132 may be provided in body portion 128 on each side of slot 130 to increase the strength of the body member. Formed at the rear of body portion 128 is a mounting flange 134 which is secured to shoulder 122 by screws 124 as shown in FIG. 1. Extending from the forward end of body portion 128 is a downwardly inclined adjustment flange 136. A pair of reversely curved spring arms 138 and 140 extend rearwardly from each side of body portion 128 and are joined at their forward ends by a connecting strip 142.

Mounted on connecting strip 142 is a bracket identified generally by reference unmeral 144 having a central plate 146 which is joined to a pair of oppositely projecting mounting lugs 148 and 150 by connecting arms 152 and 154, respectively. Mounting lugs 148 and 150 are secured to connecting strip 142 by rivets or other conventional fasteners through matched openings in the lugs and strip. Formed in the central portion of connecting strip 142 is an opening 156 in which is secured the end of feedback plunger 102 (FIG. 1). In its normal, or unstressed position, edge 158 between adjustment flange 136 and body portion 128 rests against the upper wall 160 of recess 32, and connecting strip 142 resiliently floats in cavity 32 and is engageable with the free end of flapper 118. A rivet or projection 160 may be secured to the free end of flapper 118 to ride against strip 142. Flapper 118 thus follows the movement of connecting strip 142 until the flapper seats against the nozzle to close opening 44.

Bracket 144 is secured to the central portion of diaphragm 60 by means of a threaded fastener 161 extending through a pressure plate 162, a spacer 164 and plate 146 of bracket 144. Thus, movement of diaphragm 60 is transmitted to spring arms 138 and 140 through the pressure plate 162 and bracket 144, which in turn acts through connecting strip 142 to adjust the position of flapper 118 relative to nozzle 42.

Threadedly mounted in plate member 22 is a range adjustment screw 166, the end 168 of which is engageable with adjustment flange 136 of range spring 126. Advancement of screw 166 toward the right in FIG. 1 causes body member 128 to shift downwardly to exert a biasing force on connecting strip 142 in a direction to urge flapper 118 away from leak port 44. Range spring 166 thus adjusts the set point of the device, that is, the pressure differential required between chambers 56 and 58 to cause flapper 118 to assume a position closing leak port 44. With port 64 connected with the high pressure or upstream side of a damper or diffuser in a duct, and port 62 connected with the downstream low pressure side, an excess of pressure in chamber 58 over that in chamber 56 will act on diaphragm 60 to move it in an upward direction in FIG. 1 and shift connecting strip 142 in a direction to permit flapper 118 to close the nozzle. Conversely, increases in pressure in feedback chamber 96 will act on diaphragm 98 to exert a downward force in FIG. 1 on connecting strip 142 tending to move flapper 118 in a direction to uncover nozzle opening 44 and thereby decrease the nozzle pressure.

*Operation*

Diaphragm 60 measures the controlled variable by sensing the pressure differential between ports 62 and 64. When the value of the controlled condition deviates from the desired value, diaphragm 60 changes the position of flapper 118 to vary the nozzle pressure. For example, the flow through a duct of an air conditioning or heating system can be measured by connecting port 62 with a low static pressure tap downstream of a grill, heating or cooling coil, or damper positioned in the duct, and connecting port 64 with a high static pressure tap upstream of the grill, coil or damper. Consequently, the pressure differential between chambers 56 and 58 acting on diaphragm 60 will be proportional to the volume or rate of flow of air through the duct. Variations in the pressure differential acting on diaphragm 60 will cause diaphragm 60 to reciprocate between chamber 56 and 58, and such reciprocation will in turn shift flapper 118 relative to nozzle opening 44 and vary the pressure at the nozzle. By connecting output port 80 with a conventional damper motor, an output signal will be transmitted to the damper motor to change the position of the damper and correct the deviation in a manner to be presently described.

Supply port 46 is connected to a source of compressed air at a constant pressure which flows through passage 48, filter chamber 50, passage 52, and fixed restrictor 54 into control chamber 36. Since opening 55 of restrictor 54 is smaller than opening 44 of the nozzle, when flapper 118 is positioned a sufficient distance from the nozzle so as to have no influence on the nozzle pressure, the pressure in control chamber 36 will be substantially atmospheric.

When the differential pressure acting on diaphragm 60 deviates from the set point (as determined by the position of adjustment screw 166) in a direction to move diaphragm 60 upwardly in FIG. 1, flapper 118 moves toward nozzle port 44 to increase the nozzle pressure. The increase in nozzle pressure acts on the relatively large area of diaphragm 38 to exert an upward force (as viewed in FIG. 1) on plate 88 to first seat exhaust member 86 against the stem of relay valve 72, and then unseat relay valve 72 from port 70 thereby connecting branch chamber 78 with supply pressure. As soon as port 70 is opened, an output pressure signal is transmitted through port 80 to a final control element such as a pneumatic damper motor. When the combined forces of spring 74 and 90 and branch chamber pressure acting on diaphragm 76 equals the force exerted by the pressure in chamber 36 on diaphragm 38, relay valve 72 assumes the position shown in FIG. 1 in which both port 70 and exhaust member 86 is closed.

As the pressure increases in branch chamber 78 following opening of port 70, it flows through passage 92 and restriction 94 to gradually charge feedback chamber 96. Feedback chamber 96 gradually charges to a pressure relative to the branch pressure determined by the setting of needle valve 114. When the pressure builds up in feedback chamber 96 to the pressure determined by the setting of needle valve 114, it exerts a force on connecting strip 142 through diaphragm 98 and plunger 102 in the opposite direction to the input force of diaphragm 60 and repositions flapper 118 relative to the nozzle, and the output pressure from branch chamber 78 reaches a level linearly related to the condition measured by diaphragm 60. The branch pressure thereafter modulates in accordance with the position of diaphragm 60.

While a specific form of the invention has been illustrated for purposes of description, it should be understood that the invention is not limited to the exact construction illustrated, and that various alterations in the construction and arrangement of parts is possible without departing from the scope and spirit of the invention.

What is claimed is:

1. In a pneumatic control device having a flapper-nozzle assembly associated with a branch chamber in such a manner that the branch chamber is connected and disconnected with a source of compressed air at a constant pressure in response to variation in the nozzle pressure,
   a range spring assembly including:
      a body member mounted at one end on a fixed support,
      an adjusting flange formed on the free end of the body member,
      a pair of resilient arm members projecting from said body member,
      a connecting strip joining the free ends of the arm members resiliently movable in the path of the flapper to adjust the position of the flapper relative to the nozzle.
   condition responsive means engaged with said connecting strip for exerting a force on the flapper proportional to variations in a controlled condition,
   and feedback means engaged with the connecting strip responsive to increases in branch chamber pressure for exerting a force on the flapper proportional to the branch chamber pressure in a direction opposite the direction of the force exerted by the condition responsive means.

2. A pneumatic control device as defined in claim 1 further including:
   set point means engageable with the adjusting flange for selectively adjusting the unstressed position of said connecting strip relative to the nozzle-flapper assembly,
   and means for selectively adjusting the proportional relationship between the feedback force and the branch chamber pressure.

3. In a pneumatic control device having a flapper nozzle assembly associated with a branch chamber in such a manner that the branch chamber is connected and disconnected with a source of compressed air in response to variation in the nozzle pressure,
   a range spring assembly including:
      a body member mounted at one end on a fixed support,
      an adjusting flange formed on the free end of the body member,
      a slot in the body member and a pair of resilient arm members projecting from said body member on the opposite sides of said slot,
      a connecting strip joining the free ends of the arm members resiliently movable in the path of the flapper to adjust the position of the flapper relative to the nozzle,
   condition responsive means engaged with said connecting strip for exerting a force on the flapper proportional to variations in a controlled condition, said condition responsive means including:
      a central portion and opposite lug portions offset from the central portions and engaging one side of said connecting strip,
      and feedback means engaged with the connecting strip responsive to increases in branch pressure chamber for exerting a force on the flapper proportional to the branch chamber pressure in a direction opposite the direction of the force exerted by the condition responsive means, said feedback means including
   a plunger extending through said slot and between said resilient arm members and engaging said connecting strip on the side opposite engagement by said lug members.

4. The control device defined in claim 3 wherein said resilient arm members extend from the body member generally at said one end of the body member and downwardly and then under the body member on opposite sides of said slot, and wherein said connecting strip extends transversely below said body generally at said free end thereof.

5. A valve assembly including means defining a port for transmitting fluid and a flapper extending across said port for controlling flow of fluid through said port, means biasing said flapper including:
   a spring including a body fixed at one end and having an adjusting flange at the opposite end, said body having an elongated slot extending between said opposite ends thereof,
   a pair of resilient arms extending from said one end of the body under and along the opposite sides of the body on opposite sides of said slot,
   a connecting strip extending transversely below said body and interconnecting the ends of said spring arms, said connecting strip being engageable with said flapper to bias and control the position of the flapper, and said connecting strip adapted to be engaged by a biasing member extending through said slot.

6. The assembly defined in claim 5 further including a bracket comprised of a central portion generally underlying said flapper and a pair of opposite leg portions offset from said central portion and engaged with said connecting strip on the side thereof opposite said body.

References Cited by the Examiner

UNITED STATES PATENTS

| | | | |
|---|---|---|---|
| 2,290,987 | 7/1942 | Moore | 236—82 |
| 2,773,506 | 12/1956 | Bauer | 137—86 |
| 3,125,109 | 3/1964 | Kreuter | 137—82 |

FOREIGN PATENTS 421,815   1/1935   Great Britain.

WILLIAM F. O'DEA, *Primary Examiner.*

ALAN COHAN, *Examiner.*